Patented Jan. 10, 1928.

1,655,697

UNITED STATES PATENT OFFICE.

RICHARD HERZ, OF FRANKFORT-ON-THE-MAIN, AND KARL THIESS, OF HOCHST-ON-THE-MAIN-SINDLINGEN, GERMANY, ASSIGNORS TO GRASSELLI DYESTUFF CORPORATION, OF NEW YORK, N. Y., A CORPORATION OF DELAWARE.

VIOLET VAT DYESTUFF AND PROCESS OF PRODUCING THE SAME.

No Drawing. Application filed February 11, 1927, Serial No. 167,579, and in Germany February 19, 1926.

U. S. application Ser. 87,676, filed on February 11th, 1926 relates to new violet vat dyestuffs of the 2-thionaphthene-2-indolindigo series corresponding probably to the general formula:

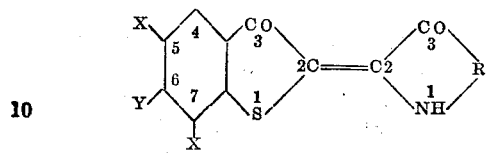

wherein X means a halogen or an alkyl group, Y means hydrogen which may be substituted by a halogen or an alkyl group and R means an aryl residue which may contain further substituents.

Now we have found that valuable vat dyestuffs of this kind giving violet dyeings are obtained by condensing hydroxythionaphthenes which are substituted in the 4- and 7-positions by an alkyl group and in 5-position by a halogen, with an α-isatin body of the general formula:

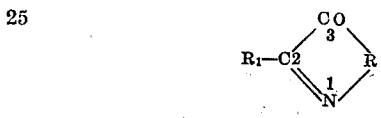

wherein R means an arylene residue, which may contain further substituents, and $R_1$ means a halogen or an arylamino group. Dyestuffs of particularly great value are obtained by our new process by using an isatin body of the general formula:

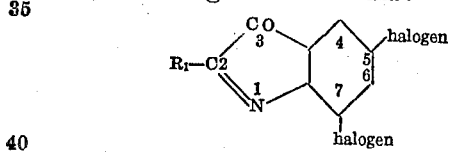

wherein $R_1$ means a halogen or an arylamino group.

The dyeings obtainable by the above defined indigoid dyestuffs are not only distinguished by their clear violet shades, but they possess, besides a good fastness to boiling, very good fastness to light. The condensations are carried out by one of the usual methods. Instead of the hydroxy-thionaphthenes above referred to, there may also be used such derivatives thereof as behave in the reaction like the free oxythio-naphthenes.

Analogues dyestuffs are produced by condensing the α-derivative of the 4.7-dialkyl-hydroxythionaphthenes instead of the α-derivatives of 4.7-dialkyl-5-halogenhydroxythionaphthenes and introducing subsequently the halogen in the 5-position by treating the said condensation products with a halogenating agent.

The following examples will serve to illustrate our invention but they are not intended to limit it thereto, all parts being by weight:

(1.) 21,6 parts of 5.7-dichlorisatin are heated in 200 parts of chlorobenzene with 22 parts of phosphorus pentachloride to 90° C. until the evolution of hydrochloric acid is complete. Into this solution of 5.7-dichlorisatin-α-chloride are introduced 21,3 parts of 4.7- dimethyl -5- chlorhydroxythionaphthene (in the form of a paste with chlorobenzene). The formation of the dyestuff sets in at once and is complete after heating for a short time. The product of the condensation is filtered and washed with alcohol. The new dyestuff, having probably the formula:

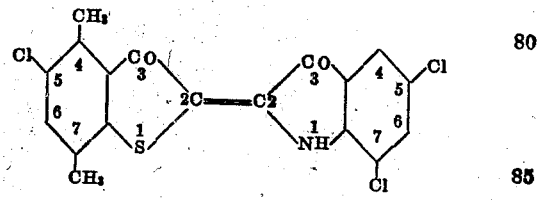

forms a violet powder which is soluble in concentrated sulfuric acid to a green solution and dyes the fibre from the vat very pure violet tints.

(2.) 17,8 parts of 4.7-dimethylhydroxy-thionaphthene are heated together with a solution of 24 parts of 5.7-dichlorisatin-α-chloride in chlorobenzene for 2-3 hours to 50-60° C. The condensation product which separates is filtered and washed with alcohol. 37,6 parts of the dyestuff powder thus obtained are introduced into 500 parts of sulfuric acid of 66° Bé., while cooling. After addition of 16 parts of bromine the whole is stirred for 2 hours, first with cooling and then it is gradually heated to 40-50° C. which temperature is maintained until the evolution of hydrogen bromide is completed. The whole is then poured on ice to which some bisulfite has been added, filtered and washed until neutral. The resulting dyestuff resembles very much that obtainable according to Example 1 and gives on the fibre tints which are very similar to those produced according to Example 1.

(3.) 30,5 parts of 5.7-dibromisatin are heated with 22 parts of phosphorus pentachloride in 300 parts of chlorobenzene and thus converted into 5.7-dibromisatin-α-chloride, which is then heated at 50-60° C. with 212 parts of 5-chlor-4.7-dimenthylhydroxythionaphthene made up into a paste with some chlorobenzene, until the formation of the dyestuff is completed. The new dyestuff, having probably the formula:

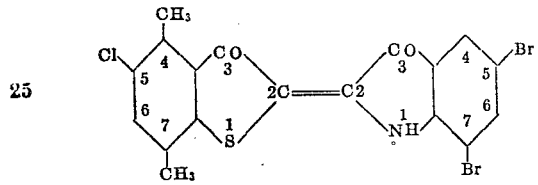

is filtered and washed with alcohol. It forms a bluish-violet powder which is soluble in concentrated sulfuric acid to a greenish-blue solution, dyeing the fibre from a yellow vat bright violet tints which are somewhat bluer than those obtainable according to Example 1.

(4.) 21,6 parts of 5.7-dichlorisatin are converted according to Example 1 into the 5.7-dichlorisatin-α-chloride which is then heated to 60-70° C. together with 25,6 parts of 5-brom-4.7-dimethylhydroxythionaphthene which has been previously made up into a paste. The dyestuff, after being separated, is filtered and washed with alcohol. The new dyestuff, having probably the formula:

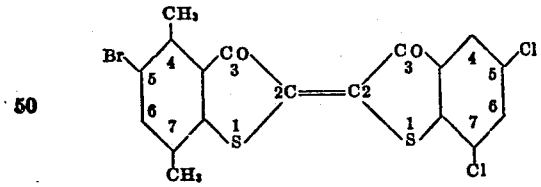

forms a bluish violet powder which is soluble in concentrated sulfuric acid to a green solution and dyes the fibre from the hydrosulfite vat bluish-violet tints.

(5.) 21,2 parts of 5-chlor-4.7-dimethylhydroxythionaphthene and 22.2 parts of isatin-α-anilide are introduced in about 200 parts of chlorobenzene or in a similarly acting solvent or diluent and the mixture is then heated for some hours while stirring until the formation of the dyestuff is finished. The dyestuff which separates when cold is filtered off and dried. 34 parts of the 5-chlor-4.7-dimethylthionaphthene-2-indolindigo thus obtained are slowly heated to 130-140° C. in 600 parts of nitrobenzene with 35 parts of bromine. This temperature is maintained until the evolution of hydrogen bromide is completed. On cooling, the mass is filtered and washed with alcohol. The resulting dyestuff is identical with that obtainable according to Example 3.

We claim:

1. As new products, the violet vat dyestuffs of the following composition:

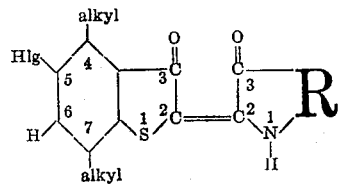

wherein R represents a substituted arylene residue.

2. As new products, the violet vat dyestuffs of the following composition:

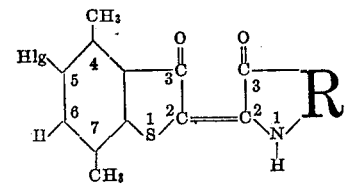

wherein R represents a substituted arylene residue.

3. As new products, the violet vat dyestuffs of the following composition:

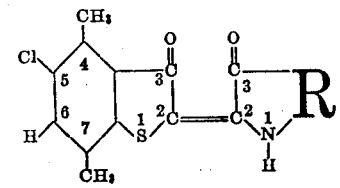

wherein R represents a substituted arylene residue.

4. As new products, the violet vat dyestuffs of the following composition:

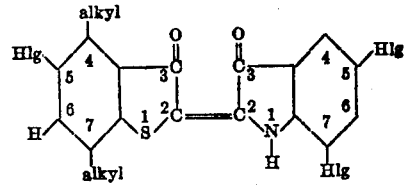

5. As new product, the violet vat dyestuffs of the following composition:

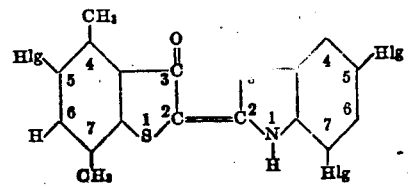

6. As new products, the violet vat dyestuffs of the following composition:

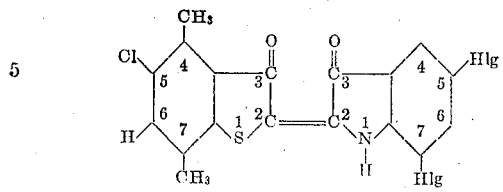

7. As a new product, the violet vat dyestuff of the following composition:

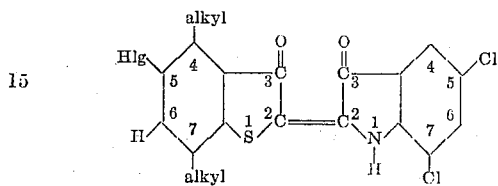

8. As new products, the violet vat dyestuffs of the following composition:

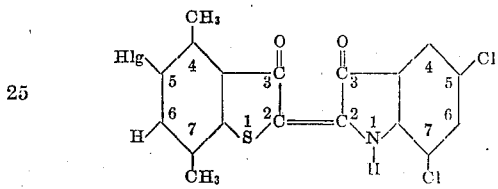

9. As new products, the violet vat dyestuffs of the following composition:

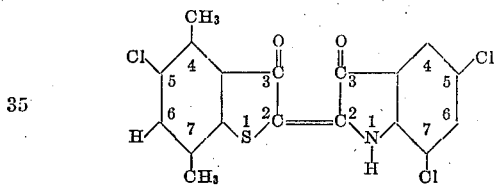

10. Process of producing violet vat dyestuffs by condensing a 4.7-dialkyl-5-halogenhydroxythionaphthene with a substituted isatin-α-derivative.

11. Process of producing violet vat dyestuffs by condensing a 4-7-dimethyl-5-halogenhydroxythionaphthene with a substituted isatin-α-derivative.

12. Process of producing violet vat dyestuffs by condensing a 4-7-dimethyl-5-chlorhydroxythionaphthene with a substituted isatin-α-derivative.

13. Process of producing violet vat dyestuffs by condensing a 4-7-dialkyl-5-halogenhydroxythionaphthene with a 5.7-dihalogen-isatin-α-derivative.

14. Process of producing violet vat dyestuffs by condensing a 4-7-dimethyl-5-halogenhydroxythionaphthene with a 5.7-dihalogen-isatin-α-derivative.

15. Process of producing violet vat dyestuffs by condensing a 4.7-dimethyl-5-chlorhydroxythionaphthene with a 5.7-dihalogen-isatin-α-derivative.

16. Process of producing violet vat dyestuffs by condensing a 4.7-dialkyl-5-halogenhydroxythionaphthene with a 5.7-dichlor-isatin-α-derivative.

17. Process of producing violet vat dyestuffs by condensing a 4.7-dimethyl-5-halogenhydroxythionaphthene with a 5.7-dichlor-isatin-α-derivative.

18. Process of producing violet vat dyestuffs by condensing a 4.7-dimethyl-5-chlorhydroxythionaphthene with a 5.7-dichlor-isatin-α-derivative.

In testimony whereof, we affix our signatures.

RICHARD HERZ.
KARL THIESS.